United States Patent [19]

Yamaki et al.

[11] Patent Number: 5,671,393
[45] Date of Patent: Sep. 23, 1997

[54] SHARED MEMORY SYSTEM AND ARBITRATION METHOD AND SYSTEM

[75] Inventors: Norihiro Yamaki, Nara-ken; Noriyuki Takao; Hidetoshi Takano, both of Toyota, all of Japan

[73] Assignees: Toyota Jidosha Kabushiki Kaisha, Toyota; Sharp Kabushiki Kaisha, Osaka, both of Japan

[21] Appl. No.: 717,149

[22] Filed: Sep. 20, 1996

Related U.S. Application Data

[63] Continuation of Ser. No. 301,933, Sep. 7, 1994, abandoned.

[30] Foreign Application Priority Data

Oct. 1, 1993 [JP] Japan ................. 5-246678

[51] Int. Cl.$^6$ ......................................... G06F 13/16
[52] U.S. Cl. ............................. 395/477; 395/291
[58] Field of Search ................................. 395/291, 293, 395/297, 304, 477, 478

[56] References Cited

U.S. PATENT DOCUMENTS

| | | | |
|---|---|---|---|
| 4,096,572 | 6/1978 | Namimoto | 395/293 |
| 4,374,413 | 2/1983 | Comfort et al. | 395/731 |
| 4,374,414 | 2/1983 | Comfort et al. | 395/731 |
| 4,449,183 | 5/1984 | Flahive et al. | 395/478 |
| 4,682,282 | 7/1987 | Beasley | 395/732 |
| 4,698,753 | 10/1987 | Hubbins et al. | 395/200.05 |
| 4,773,037 | 9/1988 | Comforti | 395/500 |
| 4,882,702 | 11/1989 | Struger et al. | 395/822 |
| 5,047,921 | 9/1991 | Kinter et al. | 395/474 |

FOREIGN PATENT DOCUMENTS

| | | |
|---|---|---|
| 614 190 | 8/1991 | Australia. |
| 4-195202 | 7/1992 | Japan. |

*Primary Examiner*—David L. Robertson
*Attorney, Agent, or Firm*—Kenyon & Kenyon

[57] ABSTRACT

A shared memory system and an arbitrating method and system. When the processing is distributed over a plurality of CPUs (e.g., CPUA and CPUB) and if it is desired that a shared memory is used to transfer data between the CPUs, a clock CKG indicating the CPUA access timing clock is generated. A gate signal G indicating the access right to the shared memory is generated in synchronism with the clock CKG. When either of the CPUs requests the access to the shared memory, it makes the corresponding chip select signal $CSA^-$ or $CSB^-$ L-level. The access right is always directed to the CPUA and switched to the CPUB in response to the access demand from the CPUB. After one access has completed, the CPUB makes $CSB^-$ H-level. Thus, the access right is switched to the CPUA. After one access has terminated, the CPUA makes $CSA^-$ H-level. If the CPUB requests the access at this time, the access right is switched to the CPUB. If the CPUB does not request the access, the access right is maintained at the CPUA. The CPUA and CPUB are synchronized with each other through a wait signal $WAITA^-$. When the shared memory is to be accessed, no software is required. The speed of data transfer can be increased and the loads on the CPUs will not influence each other.

7 Claims, 11 Drawing Sheets

SHARED MEMORY SYSTEM AND ARBITRATION METHOD AND SYSTEM

This application is a continuation of application Ser. No. 08/301,933, filed on Sep. 7, 1994, now abandoned.

BACKGROUND OF THE INVENTION a) Field of the Invention

The present invention relates to a memory system shared by a plurality of processors, e.g. CPUs (central processing units) and particularly to a control of changing access rights.

b) Description of the Prior Art

FIG. 7 shows a system in which a main CPU 10 is connected to a plurality of functional modules 12 through a main system bus 14. Each of the functional modules 12 functions to process information from the main CPU 10 through the main system bus 14 or to supply information to the main CPU 10 through of the main system bus 14. It is now assumed that one of the functional modules 12 is a communication module, for example. On transmission, the functional module 12 processes data from the main CPU 10 through the main system bus 14, the processed data being then transmitted to an external instrument. On reception, the functional module 12 processes data from the external instrument, the processed data being then transferred to the main CPU 10 through the main system bus 14.

To increase the processing speed in the functional modules 12, for example, distributed processing may be used. As shown in FIG. 8, various functions of the functional modules 12 are distributed over a plurality of CPUs, rather than being borne by a single CPU. In the illustrated example, among the processes to be executed by one functional module 12, the data transmission/reception through the main system bus 14 between the functional module 12 and the main CPU 10 is borne by a system bus interface CPU 16. The communication and other function processings are borne by a function processing CPU 18. Data is transferred between the system bus interface CPU 16 and the function processing CPU 18, if required. Thus, the burden per CPU can be relieved to provide high-speed processing.

To provide a preferred distribution of processing, the speed of data transfer between the CPUs 16 and 18 must be improved. Since the CPUs are generally operating asynchronously, the high-speed data transfer therebetween is very difficult. Even if the distribution of processing over the functional modules 12 is performed, the high-speed operation in the functional module 12 could not be attained when the speed of data transfer between the CPUs is low. To overcome such a problem, there may be provided a memory shared by a plurality of CPUs relating to the distribution of processing.

FIGS. 9 and 10 show the general forms of such shared memories.

Referring first to FIG. 9, a shared memory is a dual-port RAM (random access memory) 20. The dual-port RAM 20 has ports 1 and 2. The dual-port RAM 20 is accessed by CPUA and CPUB through the ports 1 and 2, respectively. The CPUA and CPUB may correspond to the system bus interface CPU 16 and function processing CPU 18 of FIG. 8, respectively. In FIG. 9, reference numerals 22 and 24 denote system buses for CPUA and CPUB respectively.

When the shared memory having such an arrangement is used, the rapid data transfer between the CPUs can be realized simply or by only performing the read/write in the CPUA or CPUB. However, the dual-port RAM is generally expensive and frequently has insufficient capacity. If such a shared memory is used by each of the functional modules 12 in such a system as shown in FIG. 7, various problems may be raised such as increase of the system cost and others.

FIG. 10 shows another shared memory in the form of a pseudo dual-port RAM 26 which can execute the data transfer between CPUs without the use of any dual-port RAM. The pseudo dual-port RAM 26 comprises a general-purpose SRAM (static RAM) 28 and a bus arbiter/selector 30. When CPUA or CPUB is to access the general purpose SRAM 28, the bus arbiter/selector 30 arbitrates the access request or selects a bus to be connected. Such a shared memory can provide various advantages such as reduction of the cost and others since the general purpose SRAM 28 used is inexpensive and has an increased capacity. Further, the entire system can be reduced in size since the bus arbiter/selector 30 can be integrated by use of a semi-custom LSI or the like.

An example of the pseudo dual-port RAM 26 is described in Japanese Patent Laid-Open Hei 4-195202. Such a pseudo dual-port RAM uses a single-port RAM for performing the data transfer between a programmable controller itself and its peripheral equipment. At this time, the selection of a bus is carried out by a status register control unit. The access right to the single-port RAM, which is a shared memory, is transferred from one CPU (which is one of the programmable controllers and its peripheral equipment) to another CPU after the one CPU has executed a series of accesses. This can realize the data transfer in a rapid and inexpensive manner since the inexpensive single-port RAM is used as a shared memory.

The pseudo dual-port RAM 26 can be realized by such an arrangement as shown in FIG. 11. In this arrangement, the bus arbiter/selector 30 comprises a bus arbiter 32, a data bus selector 34 and an address bus selector 36.

The bus arbiter 32 performs a bus connection control to connect the CPUA and CPUB selectively to the general purpose SRAM 28. Thus, various control signals are transferred between the CPUA and CPUB and the bus arbiter 32. The bus arbiter 32 responds to an access request from the CPUA or CPUB and also to the termination of an access to select one of the CPUs that is to be connected to the general purpose SRAM 28. Depending on the result of selection, the bus arbiter 32 supplies a gate control signal to the data bus selector 34 and an access right command signal to the address bus selector 36, respectively.

The data bus selector 34 comprises a bidirectional bus buffer 40 connected to the data bus 38 of the CPUA, another bidirectional bus buffer 44 connected to the data bus 42 of the CPUB, and data bus 46 connecting the bidirectional bus buffers 40, 44 to the general purpose SRAM 28. The bidirectional bus buffers 40 and 44 are responsive to the gate control signal from the bus arbiter 32 to be controlled so that one of the bidirectional bus buffers is opened while the other is closed. Therefore, the gate control signal can be used to select the data buses 38 or 42 connected to the data bus 46.

The address bus selector 36 selectively connects the address bus 48 or 50 of the CPUA or CPUB to the address bus 52 of the general purpose SRAM 28. Such a selection and connection is carried out in response to the access right command signal. Although read/write signal lines from the CPUA and CPUB are also actually selected and connected to the SRAM 28 with the address bus, this is omitted herein for simplicity.

FIG. 12 shows the layout of a bus arbiter 32. The illustrated bus arbiter 32 comprises two D flip flops (DFFs) 54, 56, an RS flip flop (RSFF) 58 and three AND gates 60, 62 and 64.

The CPUA and CPUB generate access request signals when they request the access to the general purpose SRAM 28. An access request signal from the CPUA (which will be called "CPUA access request signal") is inputted into the DFF 54 as a clock while an access request signal from the CPUB (which will be called "CPUB access request signal") is inputted into the DFF 56 as a clock. The D input of the DFF 54 is the QN output of the DFF 56 while the D input of the DFF 56 is the QN output of the DFF 54. The QN output of the DFF 54 is through the AND gate 62 inputted, as an active low reset signal, into the DFF 56. Thus, the DFF 56 will be reset when the QN output of the DFF 54 becomes L-level. As a result, signals obtained from the Q outputs of the DFFs 54 and 56 are used as CPUA and CPUB access enable signals, respectively.

On access, the CPUA and CPUB sequentially refer to the CPU access enable signals. Among them, it is the CPUA access enable signal that indicates that the CPUA is not in the middle of an access to the general purpose SRAM 28. It is the CPUB access enable signal that indicates that the CPUB is not in the middle of an access to the general purpose SRAM 28. Therefore, the CPUA access enable signal being H (High) level means that the access of the CPUA to the general purpose SRAM 28 is accepted. On the contrary, the CPUA access enable signal being L (Low) level means that the access of the CPUA to the general purpose SRAM 28 is prohibited. Such a logic may similarly be applied to the CPUB access enable signal.

On access to the general purpose SRAM 28, a bus selection signal is supplied to the data and address bus selectors 34, 36 as a gate control signal or access right command signal. The bus selection signal is the Q output of the RSFF 58. The RSFF 58 is set by the QN output of the DFF 56 and reset by the QN output of the DFF 54 supplied thereto through the AND gate 64. If the bus selection signal is L-level, the data and address bus selectors 34, 36 function to enable the access of the CPUA to the general purpose SRAM 28. On the contrary, if the bus selection signal is H-level, these selectors 34, 36 function to enable the access of the CPUB to the general purpose SRAM 28.

As the access to the general purpose SRAM 28 terminates, the CPUA and CPUB generate access end signals. The access end signal from the CPUA (which will be called "CPUA access end signal") is through the AND gate 60 inputted into the DFF 54 as an active low reset signal. On the other hand, the access end signal from the CPUB (which will be called "CPUB access end signal") is inputted into the DFF 56 through the AND gate 62 as an active low reset signal. The AND gates 60 and 62 also receive system reset signals. If the system reset signal becomes L-level, the DFF 54 and 56 will be reset.

The operations of arrangements of FIGS. 11 and 12 will be described in respect to the respective different cases.
Came Where CPUA Requests Access In such a case, the CPUA first refers to the CPUB access enable signal. If the CPUB access enable signal is H-level, it is judged that the CPUB is in the middle of an access to the general purpose SRAM 28. The CPUA waits (while executing nothing or any other process) until the access of the CPUB terminates. On termination of the access, the CPUB provides a CPUB access end signal to the bus arbiter 32 which in turn resets the CPUB access enable signal, that is, renders it L-level.

If the CPUB access enable signal is L-level, it is judged that the CPUB is not in the middle of an access to the general purpose SRAM 28. At this time, the CPUA generates a CPUA access request signal to the bus arbiter 32. The bus arbiter 32 responds to the CPUA access request signal to output a bus selection signal being L-level which in turn renders the CPUA access enable signal H-level. As the bus selection signal becomes L-level, the data and bus selectors 34, 36 connect the data and address buses 38, 48 to the general purpose SRAM 28. Thus, the CPUA will be able to access the general purpose SRAM 28. After the CPUA has confirmed that the CPUA access enable signal becomes H-level, it performs accesses (read/write) to the general purpose SRAM 28. After a series of access operations have been carried out by the CPUA, the latter outputs a CPUA access end signal indicating the termination of the access to the bus arbiter 32. The CPUA access enable signal is thus reset.
Case Where CPUB Requests Access Such a case is similar to the previous case except that the CPUA is replaced by the CPUB. More particularly, the CPUB first refers to the CPUA access enable signal. If the CPUA access enable signal is H-level, the CPUB waits until the access of the CPUA terminates. On termination of the access from the CPUA, the CPUB provides a CPUA access end signal to the bus arbiter 32 which in turn resets the CPUA access enable signal.

If the CPUA access enable signal is L-level, the CPUB generates a CPUB access request signal to the bus arbiter 32. The bus arbiter 32 responds to the CPUB access request signal which in turn renders the bus selection and CPUB access enable signals H-level. As the bus selection signal becomes H-level, the data and bus selectors 34, 36 connect the data and address buses 42, 50 to the general purpose SRAM 28. Thus, the CPUB will access the general purpose SRAM 28 after the CPUB has confirmed that the CPUB access enable signal becomes H-level. After a series of access operations have been carried out by the CPUB, the latter outputs a CPUB access end signal to the bus arbiter 32. The CPUB access enable signal is thus reset.
Case Where Both CPUA and CPUB Request Access If there is only a slight difference of time between the access requests of the CPUA and CPUB, the bus arbiter/selector 30 gives the access right to whichever one of the CPUA or CPUB initially requested the access. Namely, that CPU will be caused to access the general purpose SRAM 28.

If both the CPUA and CPUB perform completely simultaneous accesses, the bus arbiter/selector 30 gives the access right to any one of the CPUA or CPUB. In the circuit of FIG. 12, the access right is given to the CPUA since the DFF 56 is reset by QN output of the DFF 54 turned to L-level.

In any of the cases described above, even if an access is requested after it has been confirmed that the second CPU is not in the middle of an access to the general purpose SRAM 28, the first CPU is not necessarily given the access right. For example, if the CPUA is to access the general purpose SRAM 28, the CPUA generates a CPUB access request signal after it has confirmed from the CPUB access enable signal that the CPUB is not in the middle of an access to the general purpose SRAM 28. However, if the CPUB generates an access demand signal even slightly earlier than the CPUA, the bus will be changed to the CPUB. On the contrary, if the CPUB is to access the general purpose SRAM 28, the CPUB generates a CPUA access request signal after it has confirmed from the CPUA access enable signal that the CPUA is not in the middle of an access to the general purpose SRAM 28. However, if the CPUA generates an access request signal even slightly earlier than the CPUB, the bus will be changed to the CPUA. As described, therefore, each of the CPUs should perform the access after it has referred to the value of its own access enable signal.

In such a manner, the prior art performs the data transfer while the bus arbiter 32 is arbitrating the access right depending on the access request from each of the CPUs.

Since in the data transfer between the CPUs using the prior art pseudo dual-port RAM, one of the CPUs is required to wait for the termination of the access of the other CPU when the one CPU is to access a shared memory (general purpose SRAM), there were the following problems.

Firstly, a software procedure is required since when the shared memory is to be accessed by one of the CPUs, it must be judged whether the access to the other CPU terminates and whether or not the other CPU requests the access. Development of software for accomplishing such a procedure requires time and further time is required to execute such software as the shared memory is to be accessed. In other words, it creates steps of developing the software and impedes spreading of the system and improvements of data transfer and efficiency.

Secondly, if one CPU is to access a shared memory when the other CPU is in the middle of an access to the shared memory, the one CPU cannot access the shared memory until the access of the other CPU to the same shared memory terminates. Even if the one CPU is to perform only a small data transfer, it must wait until the access right is given to the one CPU after the access of the other CPU terminates. This means that the load on the one CPU influences the other CPU. As a result, the effect of the distribution of processing over the CPUs will be reduced. Further, whether or not the access of the other CPU has terminated must be monitored. This produces unnecessary time and reduces the speed of data processing.

Thirdly, where one CPU transfers data from an external memory or I/O to the shared memory or where the one CPU transfers data from the shared memory to the other memory or I/O, the waiting time in the other CPU sharing the same memory is further remarkably increased. For example, where data is transferred from the external memory or I/O to the shared memory, this procedure will repeat operations including "read data from the other memory or I/O" and "write the read data into the shared memory". More than half of the data transferring/processing time is occupied by the operation not directly relating to the shared memory (read data from the other memory or the like). Such a problem is raised even in a high-speed mode such as DMA (direct memory access) mode.

Forthly, in the arrangement as particularly described in Japanese Patent Laid-Open Hei 4-195202, a particular CPU cannot continuously access the shared memory since when the access of one CPU to the shared memory terminates, the access right is then given to the other CPU.

SUMMARY OF THE INVENTION

An object of the present invention is to render a shared memory accessible only in a manner similar to the conventional memory access without the use of any software and to realize a reduction of transfer time, improvement of efficiency and no development of software for accomplishing an access to the shared memory. Another object of the present invention is to render the transfer of access right from one CPU to the other unnecessary when a small amount of data is to be written to or read out of the shared memory, so that the load on one CPU will hardly affect the other CPU and the expending of unnecessary time as well as the reduction of data processing speed can be prevented. Still another object of the present invention is to prevent any waiting time from being necessary by making the access of one CPU to the shared memory possible if data is to be transferred between the shared memory and the other memory or I/O and when the other CPU is in the middle of an access to the other memory or I/0.

According to one aspect of the present invention, a shared memory system comprises:
- a) a shared memory accessible by a processor having its own access right; and
- b) arbitrating means for arbitrating access requests from a plurality of processors and giving an access right to any one of said processors which generates an access request, said arbitrating means comprising:
  - b1) means for causing the giving up of the access right of said processor each time one access to the shared memory terminates;
  - b2) means for giving the access right to another one of the plurality of processors when it is holding an access request at a point of time wherein the access right has been given up; and
  - b3) means for maintaining the access right at the first processor when the second processor does not generate the access demand and the first processor having had the access right generates the access demand at the point of time wherein the access right has been given up.

According to the second aspect, the present invention provides an arbitration system for arbitrating shared memory access demands from a plurality of processors to give an access right to any one of said processors which is holding its access request, said arbitration system comprising:
- a) means for causing the giving up of access right of said processor each time one access to the shared memory terminates;
- b) means for giving the access right to another one of said plurality of processors when it generates an access demand at a point of time wherein the access right has been given up; and
- c) means for giving the access right at the first processor when said one of said plurality of processors does not generate the access request and the first processors having had the access right generates the access request at the point of time wherein the access right has been given up.

According to the third aspect, the present invention provides a method of arbitrating shared memory access requests from a plurality of processors to give an access right to any one of said processors which generates its access request, said method comprising the steps of:
- a) causing the giving up of the access right of said processor each time one access to the shared memory terminates;
- b) giving the access right to another one of said plurality of second processors when it generates an access request at a point of time wherein the access right has been given up; and
- c) maintaining the access right at the first processor when said one of said plurality of processors does not generate the access request and the first processor having had the access right generates the access request at the point of time wherein the access right has been given up.

According to the present invention, a processor after it has acquired the access right, gives up the access right each time one access terminates. If the other processor generates its access demand at this time, the access right is transferred to the other processor. If this is not the case, the access right is subsequently maintained in the first processor.

If a plurality of processors compete against each other for an access request, the access right will be transferred from one processor to another each time one access has been completed. As a result, all the processors are not required to wait until a series of accesses have completed by a processor. Further, a particular processor can continuously access the shared memory unless any other processor generates its access request. This ensures that the load on a processor hardly affects the processing in any other processor, thus eliminating problems relating to expending unnecessary time and increase of processing speed. In addition, the aforementioned arbitration logic can be accomplished in a hardware manner, rather than a software manner. Thus, there is no problem due to software processing and software development.

Each of the processors usually comprises a data bus for transferring data between that processor and the shared memory and an address bus for specifying an address to be accessed on the shared memory. Similarly, the shared memory comprises a data bus for transferring data between the shared memory and a processor acquiring the access right and an address bus for addressing by the processor acquiring the access right. When the access right is given to a processor, a data bus of the shared memory, from its memory device, is selectively connected to the data bus of that processor while the address bus thereof is selectively connected to the address bus of the same processor. In such an arrangement, the memory device of the shared memory can be implemented as a general purpose SRAM; a bidirectional bus buffer can serve as the data bus selecting/connecting means; and a multiplexer can serve as the address bus selecting/connecting means.

Where the data bus selecting/connecting means is in the form of a bidirectional bus buffer, the number of such bidirectional bus buffers provided corresponds to the number of processors. A gate signal applied to each of the processors for opening and closing its bidirectional bus buffer is formed by a gate signal outputted from the arbitration means for specifying a processor acquiring the access right and a chip selection signal outputted from each of the processors. A signal for indicating the direction of data transfer in each bidirectional bus buffer, that is, for indicating the access direction to the shared memory is formed by a read/write signal outputted from the corresponding processor.

On formation of the gate signal, an access timing clock is formed based on the operation timing in any one of the processors. The gate signal is formed in synchronism with this access timing clock. The arbitration means is also in synchronism with the access timing clock and forms wait signals each indicating whether or not it should give the access right to the corresponding processors. The resulting wait signals are then supplied to the corresponding processors respectively.

DETAILED DESCRIPTION OF THE PREFERRED EMBODIMENTS

Figure 1:
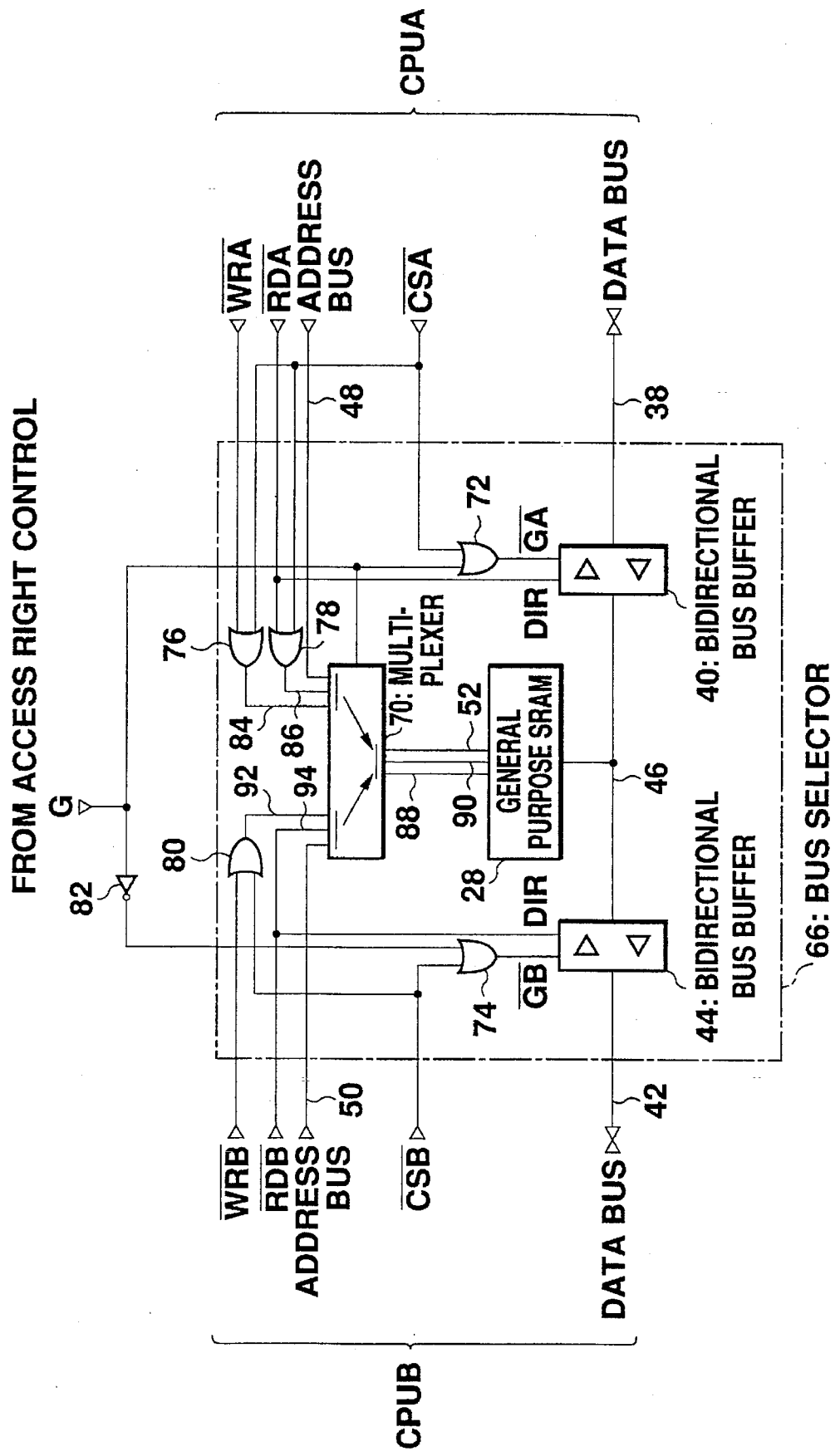
FIG. 1 is a block diagram of the internal details of a bus selector in one embodiment of the present invention.

The present invention will now be described in connection with its preferred embodiments illustrated in FIGS. 1 to 6 of the drawings, in which parts similar to those of FIGS. 7 to 12 are designated by similar reference numerals and will not further be described.

Figure 2:
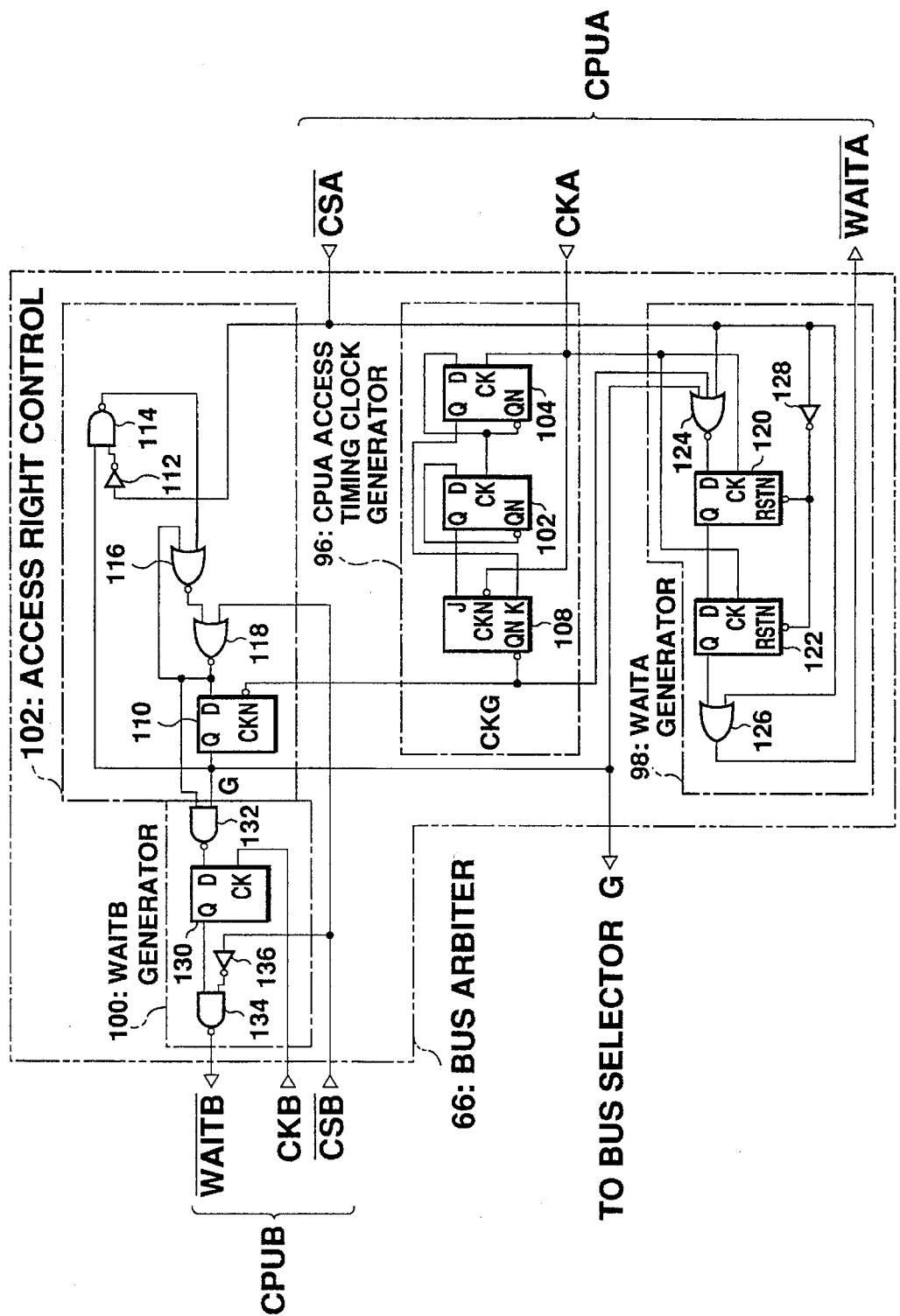
FIG. 2 is a block diagram of the internal details of a bus arbiter in the embodiment of FIG. 1.

Referring to FIGS. 1 and 2, there is shown a system constructed according to one embodiment of the present invention. The system comprises a bus selector 66 (FIG. 1) and a bus arbiter 68 (FIG. 2). In these figures, CPUA and CPUB relating to the distribution of processing are omitted for simplicity. The structure of the bus selector 66 shown in FIG. 1 is simplified, but in practice must be set for a bus switching timing depending on the operations of CPUA and CPUB. This respect will be apparent for a person skilled in the art from the description and drawings of this patent application. a) Bus Selector 66

The bus selector 66 shown in FIG. 1 receives a gate signal G from an access right control unit which will be described later; CPUA write signal WRA⁻, CPUA read signal RDA⁻ and CPUA chip select signal CSA⁻ from the CPUA; and CPUB write signal WRB⁻, CPUB read signal RDB⁻ and CPUB chip select signal CSB⁻ from the CPUB. The bus selector 66 comprises bidirectional bus buffers 40 and 44 as means for selectively connecting the data buses 38 and 42 of the CPUA and CPUB to a data bus 46, and a multiplexer 70 as means for selectively connecting the address buses 48 and 50 of the CPUA and CPUB to an address bus 52. The bus selector 66 also comprises OR gates 72 to 80.

The gate signal G is supplied to the bidirectional bus buffer 40 through the OR gate 72 as CPUA gate signal GA⁻ while the gate signal G is also supplied to the bidirectional bus buffer 44 through an inverter 82 and the OR gate 74 as CPUB gate signal GB⁻. If the CPUA gate signal GA⁻ or CPUB gate signal GB⁻ formed by an address decoder or the like in the respective CPU is L-level, the bidirectional bus buffers 40 and 44 connect the respective data buses 38 and 42 to the data bus 46. If both the CPUA and CPUB chip select signals CSA⁻ and CSB being the other inputs of the OR gates 72 and 74 are L-level, one of the bidirectional bus buffers 40 and 44 is opened while the other is closed. If the CPUA chip select signal CSA⁻ is H-level, the bidirectional bus buffer 40 is closed irrespectively of the CPUA gate signal GA⁻. If the CPUB chip select signal CSB⁻ is H-level, the bidirectional bus buffer 44 is closed independently of the CPUB gate signal GB⁻.

The gate signal G is also supplied to the multiplexer 70. If the gate signal G is L-level, the multiplexer 70 connects the address bus 48, CPUA write signal line 84 and CPUA read signal line 86 to the address bus 52, write signal line 88 and read signal line 90, respectively. The CPUA write and read signal lines 84, 86 are the outputs of the OR gates 76 or 78. The OR gate 76 receives the CPUA write signal WRA⁻ and CPUA chip select signal CSA⁻ while the OR gate 78 receives the CPUA read signal RDA⁻ and CPUA chip select signal CSA⁻. If the CPUA chip select signal CSA⁻ is L-level, therefore, the CPUA write signal WRA⁻ or CPUA read signal RDA⁻ is supplied to the general purpose SRAM 28 as a write or read signal. If the CPUA chip select signal CSA⁻ is H-level, the write and read signals supplied to the general purpose SRAM 28 become H-level.

On the contrary, if the gate signal G is H-level, the multiplexer 70 connects the address bus 50, CPUB write signal line 92 and CPUB read signal line 94 to the address bus 52, write signal line 88 and read signal line 90, respectively. The CPUB write signal line 92 is the output of the OR gate 80 which receives CPUB write signal WRB⁻ and CPUB chip select signal CSB⁻. If the CPUB chip select signal CSB⁻ is L-level, CPUB write or read signal WRB⁻ or RDB⁻ is supplied to the general purpose SRAM 28 as a write or read signal. If the CPUB chip select signal CSB⁻ is H-level, the write signal supplied to the general purpose SRAM 28 becomes H-level.

If the CPUA and CPUB chip select signals CSA⁻, CSB⁻ are L-level and the gate signal G is L-level, the data and address buses 38, 48 of the CPUA are connected to the general purpose SRAM 28 through the data and address buses 46, 52 and the supply of the CPUA write and read signals WRA⁻, RDA⁻ to the general purpose SRAM 28 is enabled. On the contrary, when the gate signal G is H-level, the data and address buses 42, 50 of the CPUB are connected to the general purpose SRAM 28 through the data and address buses 46, 52 and the supply of the CPUB write and read signals WRB⁻, RDB⁻ to the general purpose SRAM 28 is enabled. In other words, the CPUA acquires the access right when the gate signal G is L-level while the CPUB acquires the access right when the gate signal G is H-level. The CPUA or CPUB read signal RDA⁻ or RDB⁻ is supplied to the corresponding one of the bidirectional bus buffers 40, 44 as a direction indicating signal DIR indicating the direction of data transfer (read or write).

If either of the CPUA or CPUB chip select signal CSA⁻ or CSB⁻ is H-level, the corresponding bidirectional bus buffer 40 or 44 is closed and the write and read signals supplied to the general purpose SRAM 28 become H-level. In such a state, the CPU having its own chip select signal being H-level (CPUA or CPUB) cannot access the general purpose SRAM 28 irrespective of the gate signal G.

b) Bus Arbiter 68

The bus arbiter 68 shown in FIG. 2 comprises a CPUA access timing clock generating unit 96, a WAITA generating unit 98, a WAITB generating unit 100 and an access right control unit 102. The bus arbiter 68 receives a basic clock CKA and the CPUA chip select signal CSA⁻ from the CPUA and also a basic clock CKB and the CPUB chip select signal CSB⁻ from the CPUB. Further, the bus arbiter 68 respectively provides waiting signals WAITA⁻ and WAITB⁻ to the CPUA and CPUB and supplies the gate signal G to the bus selector 66.

b.1) CPUA Access Timing Clock Generating Unit 96

Figure 3:
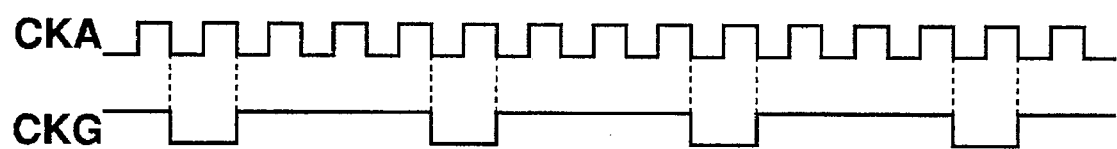
FIG. 3 is a view illustrating CPUA access timing clocks CKG.

The CPUA access timing clock generating unit 96 is a divider which comprises two DFFs 104, 106 and a JKFF 108. The basic clock CKA of the CPUA is inputted to the CK input of the DFF 104 and the CKN input of the JKFF 108. The N output of the DFF 104 is inputted into the D input of the DFF 104 and the CK input of the DFF 106; The Q output of the DFF 104 is inputted to the K input of the JKFF 108; The QN output of the DFF 106 is inputted to the D input of the same; and the Q output of the DFF 106 is inputted to the J output of the JKFF 108. As shown in FIG. 3, therefore, the QN output of the JKFF 106 outputs signal CKG having a duty ratio of 3/4, which is obtained by dividing the basic clock CKA into four. The signal CKG will be referred to as the "CPUA access timing clock".

The CPUA access timing clock CKG is thus a clock synchronized with the basic clock CKA of the CPUA. The CPUA access timing clock CKG is supplied to the access right control unit 102. As will be described later, the access right control unit 102 generates a gate signal G in synchronism with the CPUA access timing clock CKG. The gate signal G is supplied to the WAITA and WAITB generating units 98, 100 in addition to the bus selector 66. Therefore, the operation of the bus arbiter 68 is in synchronism with the basic clock CKA.

Since the memory access operation of the CPUA (including accesses to the general purpose SRAM 28, CPUA system memory and other memories) is in synchronism with the basic clock CKA, the operation of the bus arbiter 68 will be synchronized with the memory access operation of the CPUA. More particularly, the CPUA performs various accesses within a period of time from the falling to the rising of the CPUA access timing clock CKG (one clock CKG). The memory access terminates at least before the next rising of the CPUA access timing clock CKG.

b.2) Access Right Control Unit 102

Figure 4:
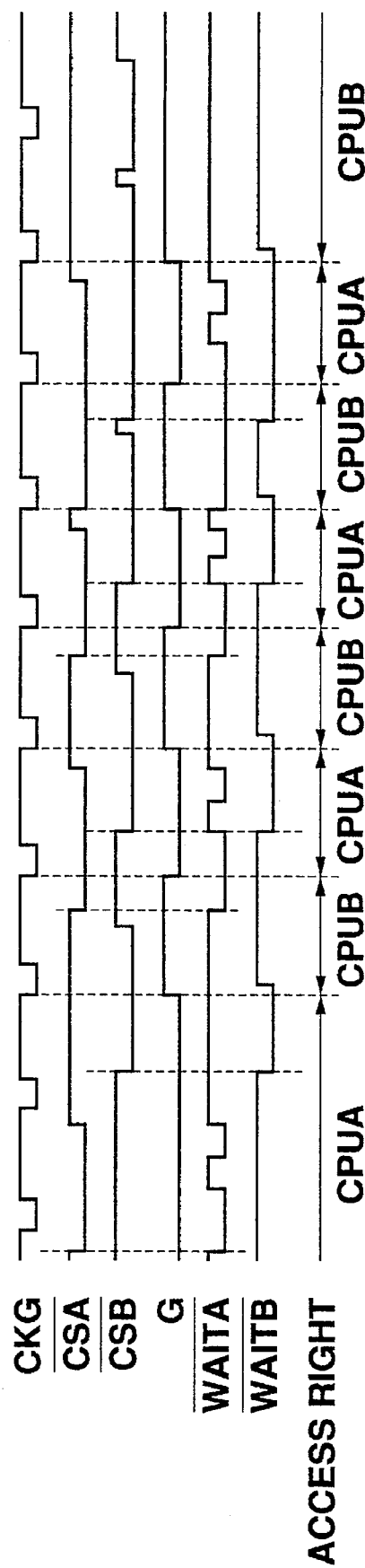
FIG. 4 is a timing chart illustrating the bus access right switching timing.

The access right control unit 102 comprises DFF 110, an inverter 112, NAND gate 114 and NOR gates 116, 118. The CKN input of the DFF 110 receives the CPUA access timing clock CKG. As shown in FIG. 4, therefore, the Q output of the DFF 110, that is a gate signal, is in the form of a signal synchronized with the CPUA access timing clock CKG. As a result, the access right to the general purpose SRAM 28 is switched depending on the rise timing of the CPUA access timing clock CKG.

If the CPUB chip select signal CSB⁻ becomes H-level, the output of the NOR gate 118 becomes L-level irrespective of the value of the CPUA chip select signal CSA⁻. Thus, the gate signal G becomes L-level at the fall timing of the CPUA access timing clock CKG. At this time, the CPUA acquires the access right in such a manner as described hereinbefore. On the contrary, if the CPUB chip select signal CSB⁻ becomes L-level, the D input of the DFF 110 becomes H-level even though the gate signal is L-level until that time. Thus, the value of the gate signal G becomes H-level. As described, the CPUB thus acquires the access right. In this embodiment, therefore, the CPUB chip select signal CSB⁻ switches the access right at the fall timing of the CPUA access timing clock CKG. If both the CPUA and CPUB chip select signals CSA⁻, CSB⁻ are L-level, the access right will be given to the CPUA which is the basic CPU.

b.3) WAITA Generating Unit 98

The WAITA generating unit 98 comprises two DFFs 120, 122, NOR gate 124, OR gate 126 and an inverter 128. The DFFs 120 and 122 are connected in series with each other, the CK inputs thereof receiving the basic clock CKA of the CPUA. CPUA wait signal WAIT⁻, which is the result of an OR operation between the Q output of the DFF 122 and the CPUA chip select signal CSA⁻, rises at the rise timing of the basic clock CKA.

Within a period of time in which the CPUA chip select signal CSA⁻ is L-level, the Q output of the DFF 122 is CPUA wait signal WAIT⁻. If the gate signal G is H-level at this time, the output of the NOR gate 124 becomes L-level.

Figure 5:
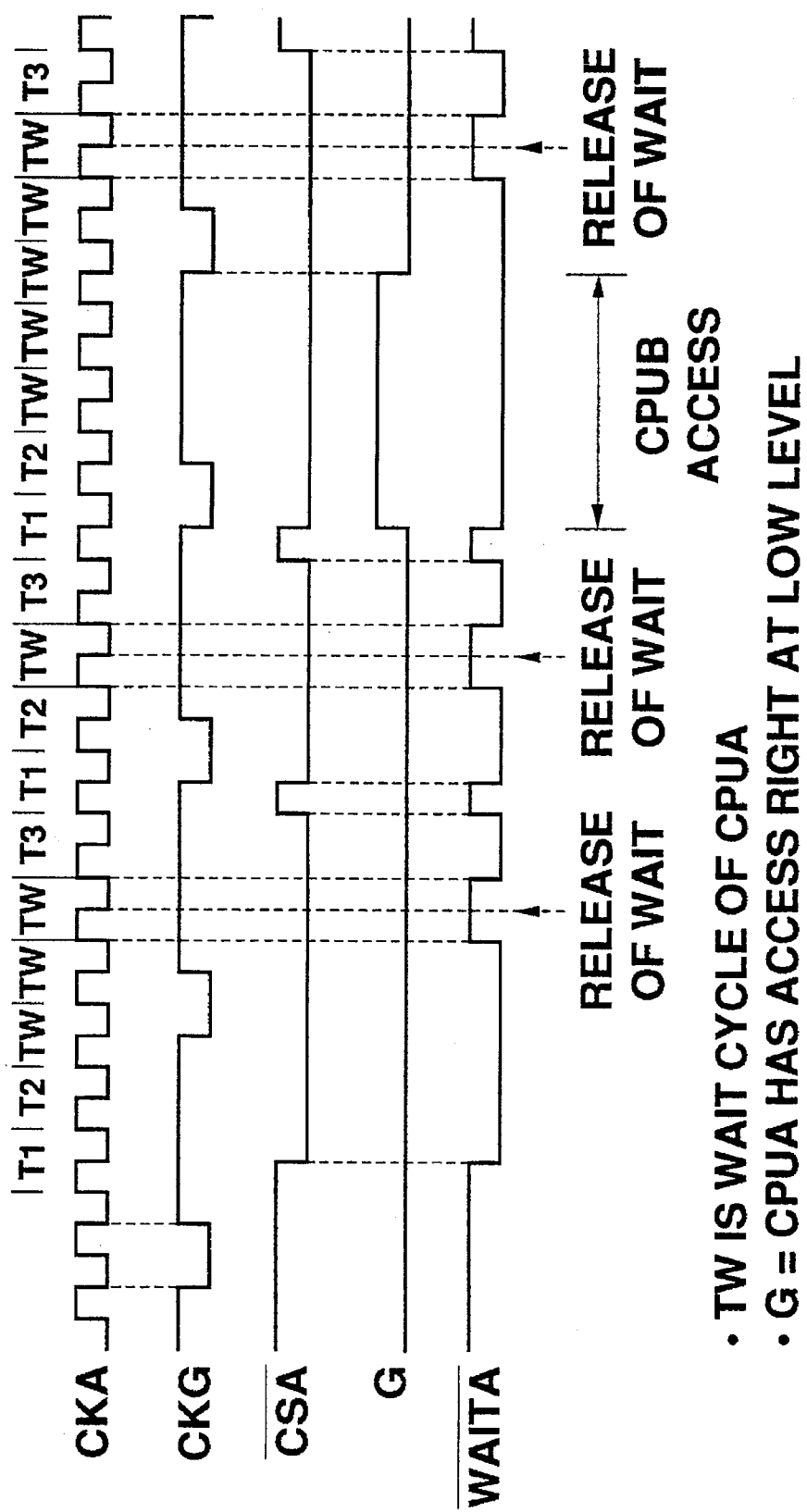
FIG. 5 is a timing chart illustrating the contents of a CPUA wait signal WAITA⁻.

As shown in FIGS. 4 and 5, therefore, the CPUA wait signal WAITA⁻. In other words, the CPUA can know the acquisition of the access right by the CPUB to wait for the access to the general purpose SRAM 28 by sensing that the CPUA wait signal WAITA⁻ became L-level. This means that the memory access operation of the CPUA is synchronized with that of the CPUB through the CPUA wait signal WAITA⁻.

If the CPUA chip select signal CSA⁻ and gate signal G are L-level and when the CPUA access timing clock CKG turns to H-level, the basic clock CKA becomes the output of the NOR gate 124. Since the basic clock CKA has been supplied to the CK inputs of the DFFs 120 and 122, the CPUA wait signal WAITA⁻ rises at the first rise timing of the basic clock CKA after the CPUA access timing clock CKG has risen. The basic clock CKA is divided into two to provide the CPUA wait signal WAITA⁻. As shown in FIGS. 4 and 5, the CPUA wait signal WAITA⁻ becomes H-level at the second fall timing of the basic clock CKA after the CPUA access timing clock CKG has fallen. When the CPUA has been given the access right, thus, it can sense the CPUA wait signal WAITA⁻ rising in synchronism with the CPUA access timing clock CKG to know the release of the wait command to itself. The CPUA executes the memory access in response to the release of the wait command and terminates the memory access by the time the third fall timing of the basic clock CKA after the CPUA access timing clock CKG has fallen.

Since the CPUA chip select signal CSA⁻ is inputted into the OR gate 126, the CPUA wait signal WAITA⁻ is H-level within the period of time when the CPUA chip select signal CSA⁻ is maintained at H-level. The CPUA can sense the CPUA wait signal WAITA⁻ being H-level to know the release of the wait command to itself. Thus, the CPUA can similarly access the memories.

b.4) WAITB Generating Unit 100

Figure 6:
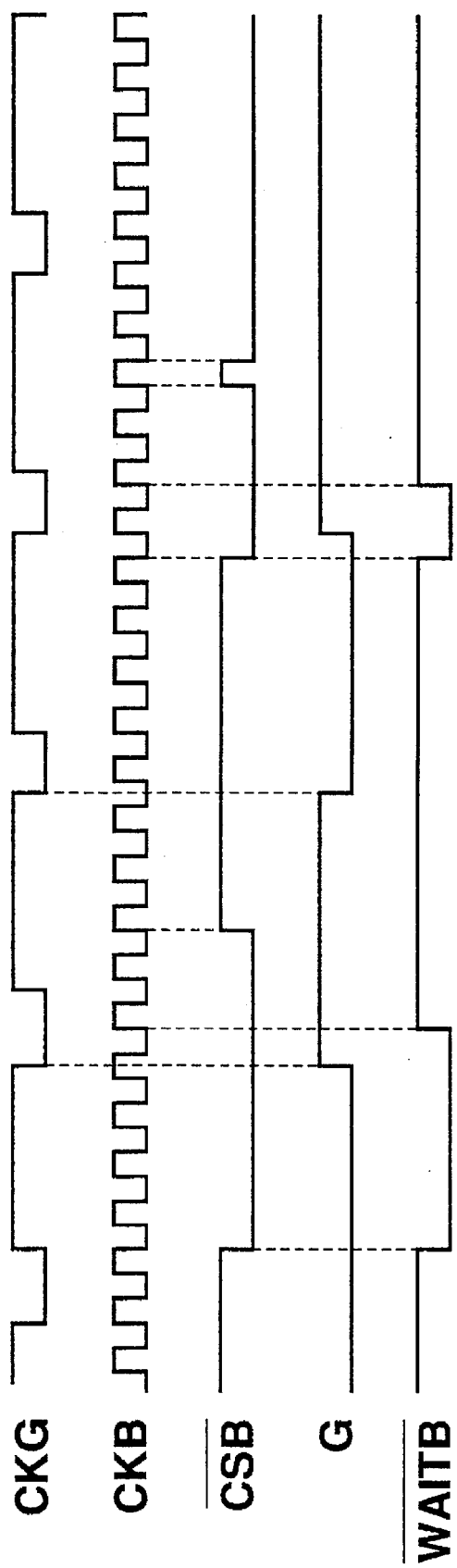
FIG. 6 is a timing chart illustrating the contents of a CPUB wait signal WAITB⁻.
Figure 7:
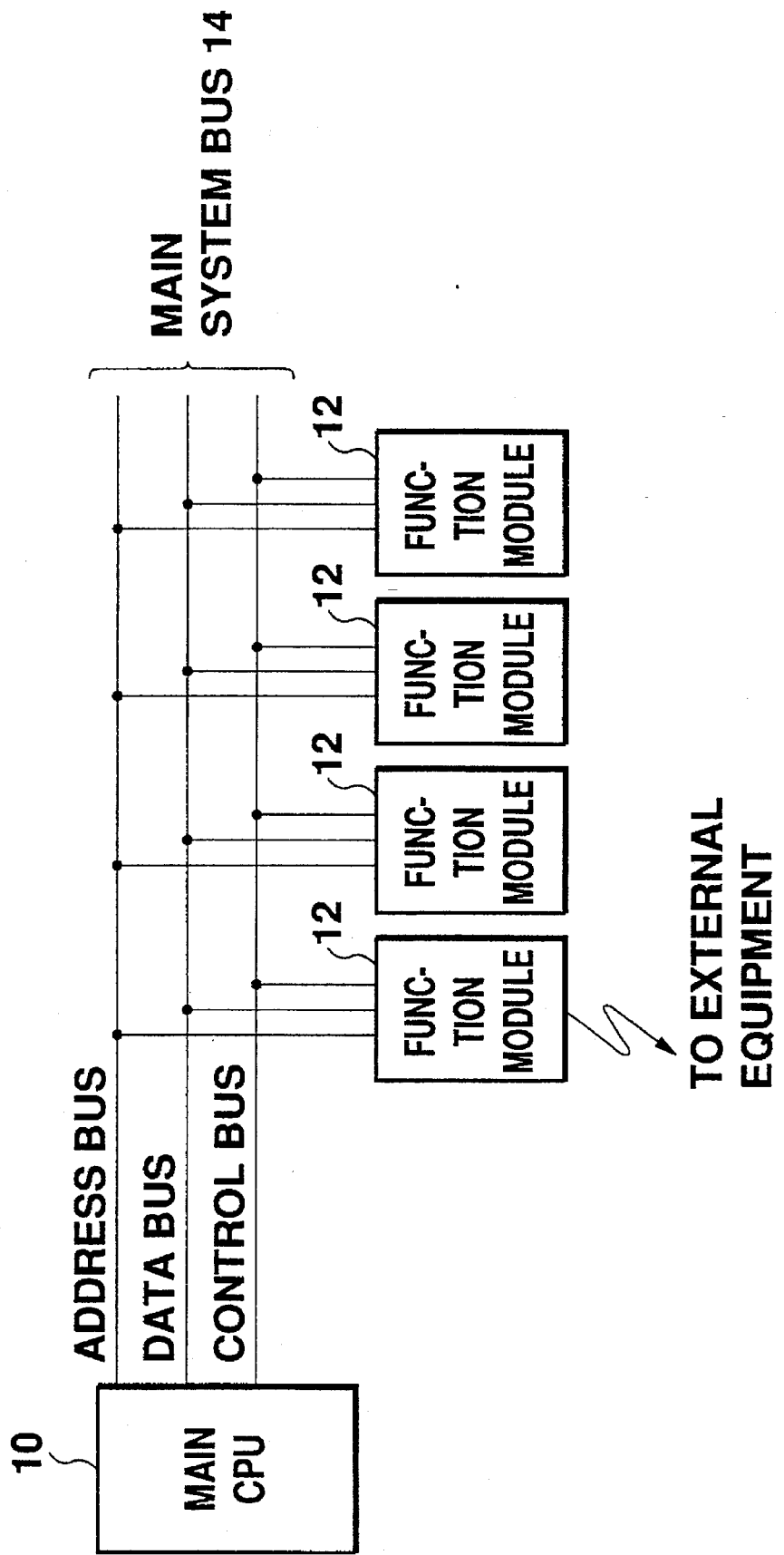
FIG. 7 is a block diagram of a system in which a main CPU controls a plurality of function modules.
Figure 8:
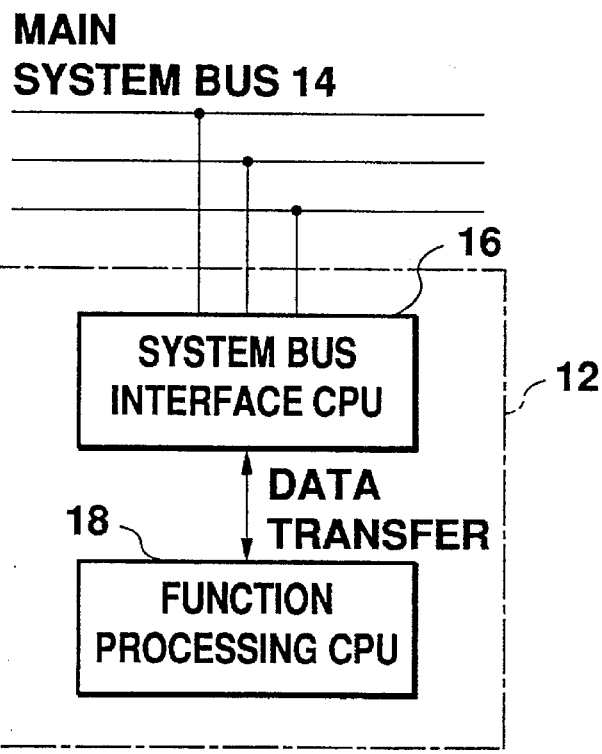
FIG. 8 is a block diagram illustrating the concept of the distribution of processing in each function module.
Figure 9:
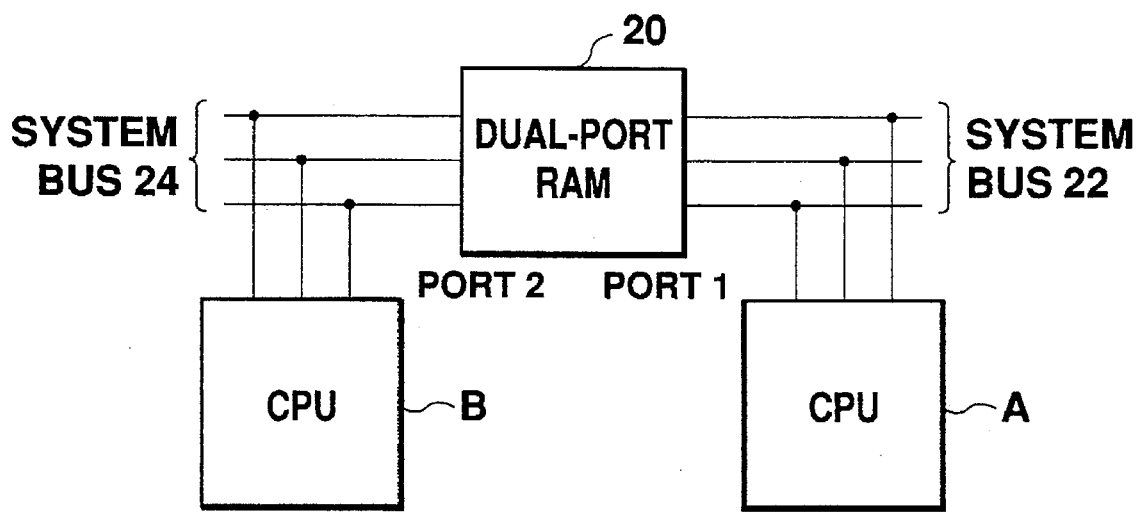
FIG. 9 is a block diagram of a function module using a dual-port RAM as a shared memory.
Figure 10:
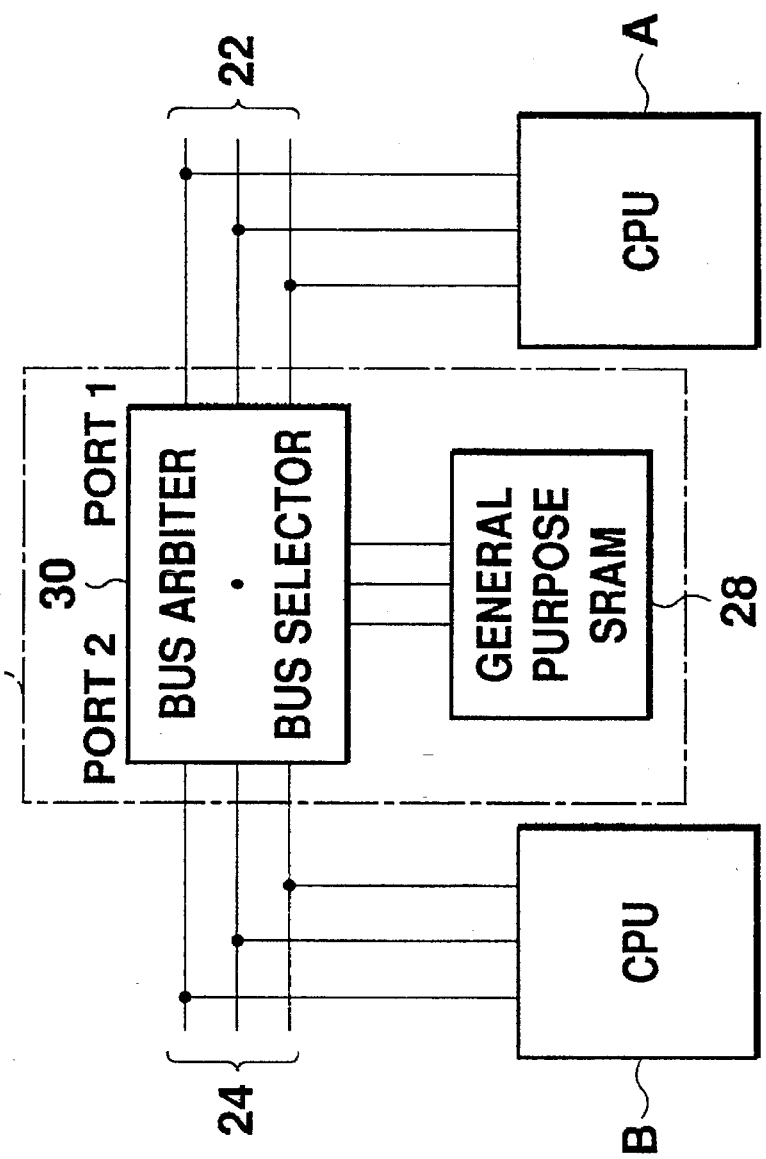
FIG. 10 is a block diagram of a function module using a pseudo dual-port RAM as a shared memory.
Figure 11:
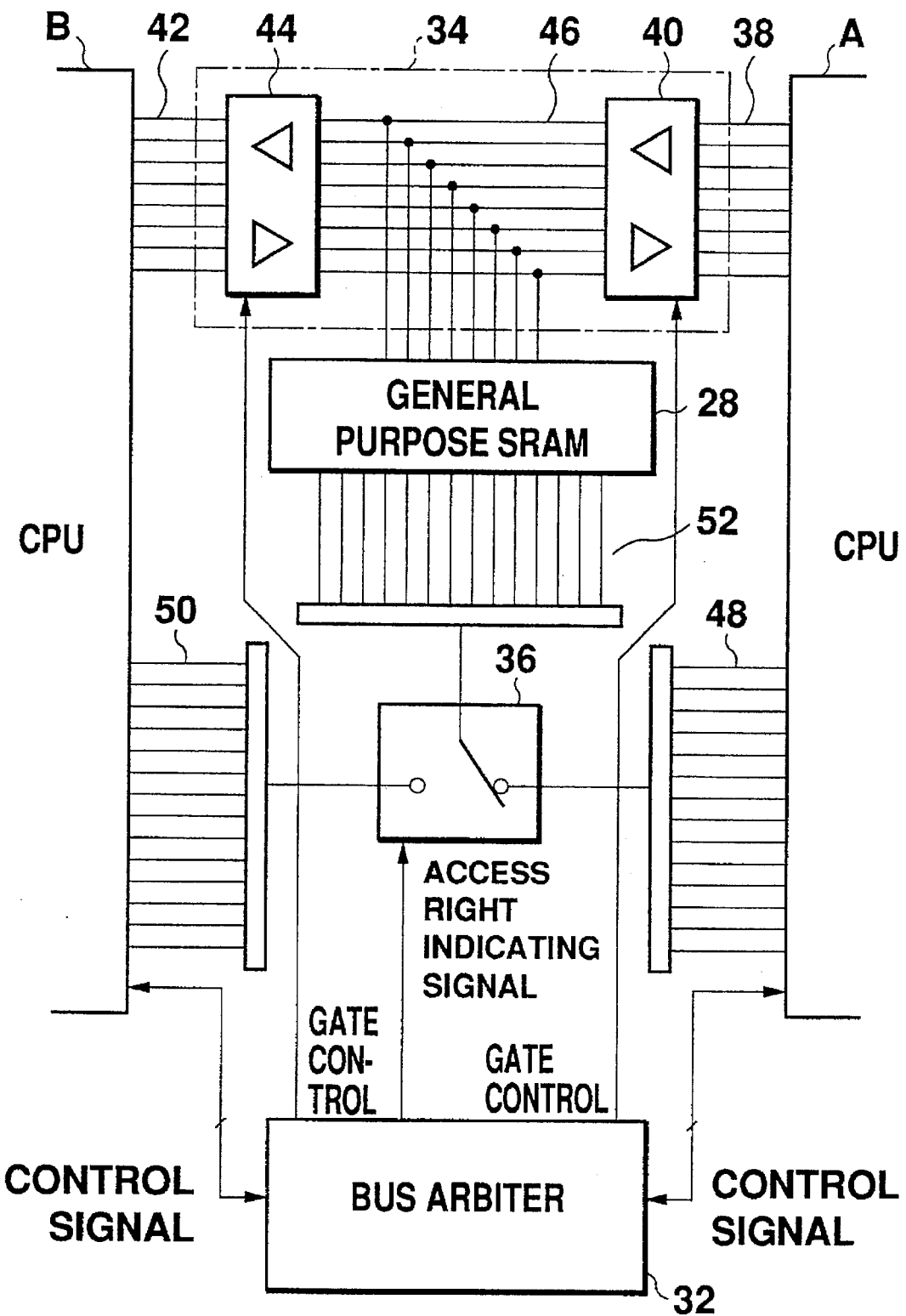
FIG. 11 is a block diagram of a pseudo dual-port RAM according to the prior art.
Figure 12:
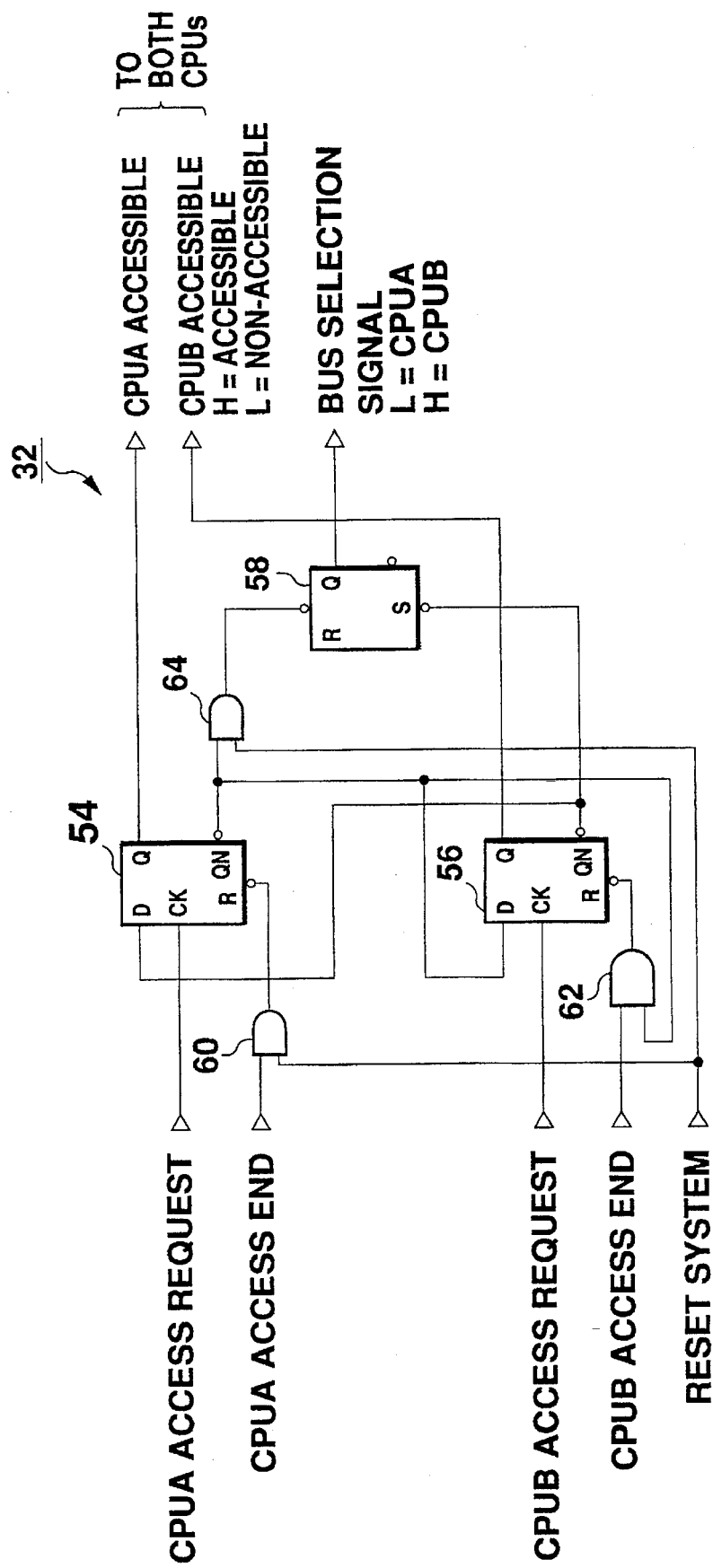
FIG. 12 is a block diagram of a bus arbiter in the pseudo dual-port RAM of FIG. 11.

The WAITB generating unit 100 comprises DFF 130, NAND gates 132, 134 and an inverter 136. Since the CK input of the DFF 130 receives the basic clock CKB of the CPUB, the Q output of the DFF 130 and thus a CPUB wait signal WAITB⁻ which is the output of the NAND 134 is synchronized with the memory access operation of the CPUB, as shown in FIGS. 4 and 6. If the CPUB chip select signal CSB⁻ is H-level, the output of the inverter 136 becomes L-level and the CPUB wait signal WAITB⁻ becomes H-level.

If the CPUB chip select signal CSB⁻ is L-level, the Q output of the DFF 130 becomes the CPUB wait signal WAITB⁻. If the CPUB chip select signal CSB⁻ is L-level, the output of the NOR gate 118 becomes H-level and the value of the gate signal G becomes H-level at the rise timing of the CPUB access timing clock CKG. Therefore, the CPUB wait signal WAITB⁻ becomes L-level at the next rise of the basic clock CKB.

As shown in FIG. 6, therefore, the CPUB wait signal WAITB⁻ becomes L-level if the CPUB changes the chip select signal CSB⁻ from H-level to L-level when the gate signal G is L-level (in which the CPUA has the access right). Thus, the CPUB is brought into its waiting state. Thereafter, the gate signal G rises in synchronism with the fall of the CPUA access timing clock CKG. The CPUB wait signal WAITB⁻ becomes H-level at the first rise of the basic clock CKB after the rise of the basic clock CKB. In other words, the waiting state of the CPUB terminates at the first rise of the basic clock CKB after the access right to the general purpose SRAM 28 has been switched from the CPUA to the CPUB. Thereafter, the CPUB executes the access to the general purpose SRAM 28.

c) Overall Operation

The overall operation of the system will be described in connection to each of the different cases.

c.1) Case Where Neither Of CPUA or CPUB Requests Access

CPUA and CPUB make the respective chip select signals CSA⁻ and CSB⁻ L-level when they request the access to the general purpose SRAM 28 and H-level when they do not request the access. When neither of CPUA or CPUB requests the access, both the chip select signals CSA⁻ and CSB⁻ are H-level. If both the chip select signals CSA⁻ and CSB⁻ are H-level, both the wait signals WAITA⁻ and WAITB⁻ become H-level, as can be seen from the previous description. On the other hand, the gate signal G becomes L-level at the fall timing of the CPUA access timing clock CKG since the chip select signal CSB⁻ is H-level. Thus, the CPUA acquires the access right. If neither of the CPUA or CPUB requests the access, the access right to the general purpose SRAM 28 is always assigned to the CPUA in such a manner.

c.2) Case Where CPUA Requests Access When CPUB Does Not Access The General Purpose SRAM 28

In such a case, the gate signal G is L-level since the CPUB chip select signal CSB⁻ is H-level. Therefore, the access right will be given to the CPUA.

c.3) Case Where CPUB Requests Access When CPUA Does Not Access The General Purpose SRAM 28

In such a case, the access right has been given to the CPUA since the gate signal G is L-level before the CPUB requests the access. When the CPUB makes the chip select signal CSB⁻ L-level to request the access to the general purpose SRAM 28, the CPUB wait signal WAITB⁻ becomes L-level to place the CPUB in its waiting state, as shown in FIG. 6. Thereafter, the CPUA access timing clock CKG falls while the gate signal G rises. In other words, the access right is switched to the CPUB. Thus, the CPUB wait signal WAITB⁻ becomes H-level at the first rise of the basic clock CKB after the gate signal G has risen. In response to this, the CPUB accesses to the general purpose SRAM 28. As this access terminates, the CPUB returns the chip select signal CSB⁻ to H-level. On the subsequent rise of the CPUA access timing clock CKG, the gate signal G rises in synchronism with this rise to return the access right to the CPUA.

c.4) Case Where CPUA Requests Access When CPUB Is Accessing General Purpose SRAM 28

When the CPUB is accessing the general purpose SRAM 28, the gate signal G is H-level and the CPUB has acquired the access right. If the CPUA makes the chip select signal CSA⁻ L-level to request the access to the general purpose SRAM 28, the wait signal WAITB⁻ becomes L-level, as shown in FIG. 6. The CPUB responds to this change and is put into its waiting state. The CPUA executes the memory access operation in synchronism with the CPUA access timing clock CKG and completes the access by the time the next rise of the clock CKG occurs. As one access to the general purpose SRAM 28 terminates, the CPUA makes the chip select signal CSA⁻ H-level. As shown in FIG. 4, thus, the gate signal G becomes H-level at the next rise of the CPUA access timing clock CKG. The access right is thus switched to the CPUB. In response to this switching, the CPUB executes the access to the general purpose SRAM 28. After termination of this access, the CPUA makes the chip select signal CSB⁻ H-level. Thereafter, the gate signal G becomes L-level at the fall timing of the CPUA access timing clock CKG. Therefore, the access right will be given to the CPUA.

c.6) Case Where Both CPUA And CPUB Request Access At The Same Time

When the CPUA and CPUB simultaneously make the chip select signals CSA⁻ and CSB⁻ L-level, the gate signal G first becomes H-level at the next fall of the CPUA access timing clock CKG. The access right is given to the CPUB. As the CPUB thereafter terminates the access to make the chip select signal CSB⁻ H-level, the access right is switched to the CPUA at the next fall of the CPUA access timing clock CKG.

c.7) Case Where Both CPUA And CPUB Continuously Request Access

In such a case, the CPUA and CPUB alternately raise the chip select signals each time one access to the general purpose SRAM 28 terminates. Through such a combination of the aforementioned operations, the access right will alternately be transferred between the CPUA and CPUB.

d) Advantages of Embodiments

Since this embodiment uses the wait signals WAITA⁻, WAITB⁻, chip select signal CSA⁻, CSB⁻ and CPUA access timing clock CKG, no software for judging whether or not the other CPU requests the access is required. Therefore, no step of developing such software is required. The time required to transfer the data and its efficiency can be improved.

Since the access right to the general purpose SRAM 28 is switched each time one access to the general purpose SRAM 28 terminates, the expending of unnecessary time can be prevented from occurring without reduction of the processing speed.

Furthermore, any waiting time in one CPU due to the operations not directly relating to the general purpose SRAM 28 is eliminated when the other CPU is performing the data transfer between the other memory or I/O and the general purpose SRAM 28.

In addition, a particular CPU (CPUA or CPUB) can continuously access the general purpose SRAM 28 if the other CPU does not request the access. The load on one of the CPUs will not affect the load on the other CPU.

e) Supplement

Although the above description have been made as to the formation of access right switching timing using the CPUA access timing clock CKG synchronized with the basic clock CKA of the CPUA, a clock synchronized with the basic clock CKB of the CPUB may be similarly used. The number of CPUs used herein is not limited to two. Although the CPUA access timing clock generating unit 96 shown in FIG. 2 has been described as to the formation of CPUA access timing clock CKG rising in three cycles of the basic clock CKA of the CPUA (that is, the CPUA performing the memory access within three of the basic clocks CKA, the present invention is not limited to such an arrangement, but may be applied to any other design depending on the memory access cycle of the CPU used therein. Furthermore, the present invention may be applied to the data transfer between the main CPU 10 and the function modules 12, in addition to the data transfer between the CPUs of the function modules 12.

What is claimed is:

1. A shared memory system comprising:

a shared memory accessible by a preferred processor, which is that processor of a plurality of processors that currently has an access right, the access right being a right to access to the shared memory in synchronization with a processor specific clock signal, the processor specific clock signal being generated in the preferred processor and being independent from other of the plurality of processors; and arbitrating means for arbitrating access requests among the plurality of processors to give an access right to one of said plurality of processors, said arbitrating means comprising:

means for causing the giving up of the access of a first processor of said plurality of processors in response to the rising or falling of the processor specific clock signal having a predetermined frequency;

means for giving the access right to a second processor of said plurality of processors when said second processor is holding an access request at a point of time when the access right has been given up; and means for returning the access right to said first processor when no other processors of said plurality of processors are holding access requests and said first processor is holding an access request at the point of time when the access right has been given up.

2. A shared memory system as defined in claim 1, wherein each of said plurality of processors comprises a data bus for transferring data to and from said shared memory and an address bus for specifying an address to be accessed on said shared memory; and wherein said shared memory comprises:

a memory including a data bus for transferring data to and from the preferred processor and an address bus for receiving the address specified by the preferred processor;

data bus switching means for selectively connecting the data bus of said memory to the data bus of the preferred processor; and address bus switching means for selectively connecting the address bus of said memory to the address bus of the preferred processor.

3. A shared memory system as defined in claim 2, wherein respective ones of said plurality of processors are operative to output read/write signals, each for indicating whether the access to the shared memory is for reading or writing data, and chip select signals, each for indicating the access request to the shared memory, and wherein said arbitrating means is operative to output a gate signal for specifying which one of the plurality of processors is the preferred processor.

4. A shared memory system as defined in claim 3 wherein said data bus switching means comprises:

means responsive to said gate signal and chip select signals for generating a plurality of different processor gate signals, one for each of said plurality of processors, to specify which one of said plurality of processors is the preferred processor;

means responsive to said read/write signals for generating a direction indicating signal for indicating whether the direction of access is for read or write; and a plurality of bidirectional bus buffers, one for each of said plurality of processors, each of said plurality of bidirectional bus buffers for causing the preferred processor only to access said memory in a manner depending on the direction indicated by said direction indicating signal corresponding to the referred processor.

5. A shared memory system as defined in claim 3 wherein said arbitrating means comprises:

means for generating an access timing clock based on the operational timing of a predetermined one of said plurality of processors;

means for generating wait signals, one provided for each of said plurality of processors, and for supplying the wait signals to corresponding ones of said plurality of processors in synchronism with the access timing clock, said wait signals each indicating whether or not said corresponding one of said plurality of processors should be given the access right; and means for generating the gate signal in synchronism with the access timing clock.

6. An arbitrating system for arbitrating shared memory access requests among a plurality of processors to give an access right to a preferred processor of said plurality processors, said arbitration system comprising:

means for causing the giving up of the access right of a first processor of said plurality of processors in response to the rising or falling of a clock signal having a predetermined frequency;

means for giving the access right to a second processor of said plurality of processors when said second processor is holding an access request at a point of time when the access right has been given up; and means for returning the access right to said first processor when no other processors of said plurality of processors are holding an access request and said first processor is holding an access request at the point of time when the access right has been given up.

7. A method of arbitrating shared memory access requests among a plurality of processors to give an access right to a preferred processor of said plurality of processors, said method comprising the steps of:

causing the giving up of the access right of a first processor of said plurality processors in response to the rising or falling of a clock signal having a predetermined frequency;

giving the access right to a second processor of said plurality of processors when said second processor is holding an access request at a point of time when the access right has been given up; and returning the access right to said first processor when no other processors of said plurality of processors are holding an access request and said first processor is holding an access request at the point of time when the access right has been given up.

\* \* \* \* \*

UNITED STATES PATENT AND TRADEMARK OFFICE
CERTIFICATE OF CORRECTION

PATENT NO. : 5,671,393
DATED : 23 September 1997
INVENTOR(S) : Norihiro YAMAKI et al.

It is certified that error appears in the above-identified patent and that said Letters Patent is hereby corrected as shown below:

| Column | Line | |
|---|---|---|
| 3 | 54 | Change "Came" to --Case--. |
| 8 | 34 | After "application." start new paragraph. |
| 13 | 18 | Change "Judging" to --judging--. |
| 13 | 68 | Insert: |
| | | --means for receiving said processor specific clock signal; |
| | | means for generating an access control signal with said processor specific clock signal;-- |
| 14 | 6 | Before "when" insert --in response to said rising or falling of said processor specific clock signal having a predetermined frequency--. |
| 15 | 3 | After "plurality" insert --of--. |

UNITED STATES PATENT AND TRADEMARK OFFICE
CERTIFICATE OF CORRECTION

PATENT NO. : 5,671,393

DATED : 23 September 1997

INVENTOR(S) : Norihiro YAMAKI et al.

It is certified that error appears in the above-identified patent and that said Letters Patent is hereby corrected as shown below:

| Column | Line | |
|---|---|---|
| 15 | 4 | After "processors," insert: --the access right being a right to access shared memory in synchronization with a processor specific clock signal, the processor specific clock signal being generated in the processor currently holding the access right and being independent from other of the plurality of processors--; after "comprising:" insert --means for receiving said processor specific clock signal; means for generating an access control signal with said processor specific clock signal;-- |
| 15 | 7 | After "falling of" delete "a" and insert --the processor specific--. |

UNITED STATES PATENT AND TRADEMARK OFFICE
CERTIFICATE OF CORRECTION

PATENT NO. : 5,671,393

DATED : 23 September 1997

INVENTOR(S) : Norihiro YAMAKI et al.

It is certified that error appears in the above-identified patent and that said Letters Patent is hereby corrected as shown below:

| Column | Line | |
|--------|------|---|
| 15 | 10 | Before "when" insert --in response to said rising or falling of said processor specific clock signal having a predetermined frequency--. |
| 16 | 1 | After "processors," insert --the access right being a right to access shared memory in synchronization with a processor specific clock signal, the processor specific clock signal being generated in the processor currently holding the access right and being independent from other of the plurality of processors--; |

UNITED STATES PATENT AND TRADEMARK OFFICE
CERTIFICATE OF CORRECTION

PATENT NO. : 5,671,393

DATED : 23 September 1997

INVENTOR(S) : Norihiro YAMAKI et al.

It is certified that error appears in the above-identified patent and that said Letters Patent is hereby corrected as shown below:

| Column | Line | |
|---|---|---|
| 16 | before line 3 | Insert --receiving said processor specific clock signal and generating an access control signal with said processor specific clock signal;-- |
| 16 | 6 | After "falling of" delete "a" and insert --the processor specific--. |
| 16 | 9 | Before "when" insert --in response to said rising or falling of said processor specific clock signal having a predetermined frequency--. |

Signed and Sealed this

Second Day of June, 1998

Attest:

BRUCE LEHMAN

Attesting Officer

Commissioner of Patents and Trademarks